Patented Jan. 6, 1953

2,624,741

UNITED STATES PATENT OFFICE 2,624,741

CHLORMETHYLATED ARYLPHTHALIMIDES

David I. Randall, Easton, Pa., and Edgar E. Renfrew, Phillipsburg, N. J., assignors to General Aniline & Film Corporation, New York, N. Y., a corporation of Delaware No Drawing. Application February 11, 1950, Serial No. 143,819

13 Claims. (Cl. 260—326)

This invention relates to the production of chlormethyl derivatives of certain arylphthalimides.

More particularly, the invention relates to the chlormethyl derivatives of N-substituted phthalimides, wherein the N-substituent is an aryl radical, such as phenyl, naphthyl and diphenyl which may be further substituted in the ring by alkyl, alkoxy and halo groups. The phthalimide nucleus may be further substituted with alkyl, nitro, amino and halo groups.

In general, the chlormethyl derivatives are produced by dissolving the phthalimides in concentrated sulfuric acid and introducing bischlormethyl ether. The process usually involves stirring the reaction mixture at temperatures of from 30 to 80° C. for several hours. The rate of the chlormethylation reaction and hence the reaction time and the entering position or positions of the chlormethyl groups depends somewhat upon the blocking and directing influence of substituent groups. In general, the introduction of a chlormethyl group is para to the nitrogen linkage, although the position will depend upon the substituent groups and the extent of the chlormethylation.

The following examples are illustrative of preferred embodiments of the invention but it will be understood that variations and substitutions may be made within the scope of the claims. The proportions in the examples are by weight.

Example I

In a suitable vessel was placed 184.0 parts sulfuric acid (99.7%). Then was added slowly with stirring 23.0 parts bischlormethyl ether and then 22.4 parts N-phenylphthalimide. The solution was stirred for fifteen hours at a temperature of 60–63° C. and allowed to cool. It was then poured with stirring into approximately 2000.0 parts water containing ice. The material which precipitated was collected on a filter and washed with water until the washings were neutral. After drying the cake weighed 27.2 parts. Analysis showed it to contain 11.3% chlorine. A product bearing one chlormethyl group, $C_{15}H_{10}O_2NCl$, contains 13.1% chlorine.

Example II

Exactly as Example I, except that 23.8 parts of N-p-tolylphthalimide was used instead of the N-phenylphthalimide. The product weighed 28.4 parts. Analysis showed it to have 11.8% chlorine. A product containing one chlormethyl group has the formula $C_{16}H_{12}O_2NCl$; Cl=12.4.

Example III 29.9 parts of N-o-diphenylphthalimide were added slowly during one hour to a solution of 175.0 parts 96% sulfuric acid and 34.0 parts of bischlormethyl ether. The temperature was held at 25° C. for one hour. The solution was poured with stirring into 1500.0 parts of water containing ice. The material which precipitated was collected on a filter and washed with water until the washings were neutral. The cake after drying weighed 40.0 parts. Analysis showed it contained 18.1 parts chlorine or a little over two chlormethyl groups per molecule. The product is believed to have the formula:

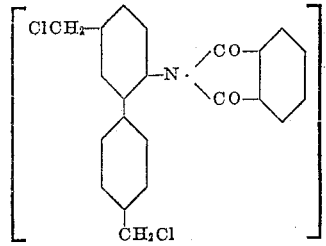

Example IV

The same procedure was used as in Example III except that in this case the imide was 23.0 parts of N-o-tolylphthalimide. The dry product weighed 25.0 parts. Analysis showed it to have 16.11% chlorine. The product bearing one chlormethyl group has the formula $C_{16}H_{12}O_2NCl$ or a chlorine content of 12.4%.

Example V 28.8 parts of N-naphthylphthalimide were added during ½ hour to a solution of 175.0 parts sulfuric acid and 34.0 parts bischlormethyl ether maintained at 25° C. This temperature was maintained for 1½ hours and then worked up as in the previous examples. It weighed 39.0 parts and the chlorine analysis showed 17% chlorine whereas the chlorine calculation for two chlormethyl groups in this compound is 18.9%.

Example VI 130.00 parts of N-phenyltetrachlorphthalimide were added to 120.0 parts 96% sulfuric acid and 80 parts bischlormethyl ether at 125° C. The temperature was held for 60 hours and the material washed as in the previous examples. 160.0 parts of the product were obtained. The material was colorless having a melting point of 270° C. The compound gave the characteristic reaction of benzyl chlorides, that is, quaternary formation.

The compounds of the present invention are intermediates which are useful in forming dyes and germicidal agents. The intermediates are useful in several types of syntheses. For instance, the compounds when heated with certain thioureas such as 1,3-dimethylthiourea, 1, 1,3-trimethylthiourea or 2-imidazolidmethione form quaternary salts which are easily soluble in water; these materials are useful as detergents. The chlormethyl groups are also capable of reacting with phenols, amines, mercaptans and other materials.

The aryl radicals of the aryl groups which undergo chlormethylation can be mono- or polycyclic, e. g. of the benzene, biphenyl, diphenyl methane or anthracene, naphthalene, phenanthrene series, but are preferably monocyclic. They can be substituted in one or more nuclear positions by substituents which are unreactive toward the chlormethylating agent under the conditions of chlormethylation, provided that at least one reactive position remains unoccupied. Suitable unreactive substituents are, for example, lower alkyl (e. g. methyl, ethyl) groups, lower alkoxy (e. g. methoxy, ethoxy) groups, halogen (e. g. chlorine, bromine).

The following are examples of some of the aryl radicals which form the N-substituent in the imide: phenyl-o-tolyl, p-tolyl, 2-chloro-p-tolyl, 2,3,4-trichloraniline, 2-ethyl-p-tolyl, 2,4-xylyl, 2,5-xylyl, 3,4-xylyl, naphthyl and biphenyl.

The phthalimides which may be used include phthalimide, 3-methylphthalimide, 4-methylphthalimide, 4,5-dibromphthalimide, 4-chlorphthalimide, 3,4-dichlorphthalimide, 3-nitrophthalimide, and 4-nitrophthalimide.

We claim:

1. As a new compound, an N-aryl phthalimide having at least one monochlormethyl substituent on said aryl, and in each remaining position of all the rings a group selected from the class consisting of hydrogen, alkyl, alkoxy, amino, nitro and halo groups.

2. A new compound of claim 1 containing 1 to 3 monochlormethyl groups.

3. Chlormethyl-substituted N-phenylphthalimide wherein the monochlormethyl is on the phenyl group.

4. Chlormethyl-substituted N-p-tolylphthalimide wherein the monochlormethyl is on the tolyl group.

5. Chlormethyl-substituted N-o-diphenylthalimide wherein the monochlormethyl is on the diphenyl group.

6. Chlormethyl-substituted N-naphthylphthalimide wherein the monochlormethyl is on the naphthyl group.

7. Chlormethyl-substituted N-phenyltetrachlorophthalimide wherein the monochlormethyl is on the phenyl group.

8. A process for preparing the compound of claim 1 which comprises reacting the correspondingly substituted phthalimide with bis-monochlormethyl ether in the presence of concentrated sulfuric acid.

9. A process of claim 8 wherein the phthalimide is N-phenylphthalimide.

10. A process of claim 8 wherein the phthalimide is N-p-tolylphthalimide.

11. A process of claim 8 wherein the phthalimide is N-o-diphenylphthalimide.

12. A process of claim 8 wherein the pthalimide is N-naphthylphthalimide.

13. A process of claim 8 wherein the phthalimide is N-phenyltetrachlorophthalimide.

DAVID I. RANDALL.
EDGAR E. RENFREW.

REFERENCES CITED

The following references are of record in the file of this patent:

UNITED STATES PATENTS

| Number | Name | Date |
| --- | --- | --- |
| 2,087,715 | Wolfram | July 20, 1937 |

OTHER REFERENCES

Beilstein: Handbuch der Organischen Chemie, vol. 21 (Vierte Auflage), p. 467 citing Strassmann, B 21, 580.